United States Patent [19]  
Potts et al.

[11] 3,853,787  
[45] Dec. 10, 1974

[54] PROCESS FOR PREPARING METAL ZEOLITE CATALYST COMPOSITIONS

[75] Inventors: John D. Potts, Springfield; Francis William Kirsch, Wayne, both of Pa.

[73] Assignee: Sun Research and Development Co., Philadelphia, Pa.

[22] Filed: Aug. 23, 1972

[21] Appl. No.: 283,254

[52] U.S. Cl. .............................. 252/455 Z, 423/112
[51] Int. Cl. .............................................. B01j 11/40
[58] Field of Search .................. 252/455 Z; 423/112

[56] References Cited
UNITED STATES PATENTS

| | | | |
|---|---|---|---|
| 3,524,809 | 8/1970 | Hansford | 252/455 Z |
| 3,617,507 | 11/1971 | Oettinger et al. | 252/455 Z |
| 3,694,345 | 9/1972 | Bittner | 252/455 Z |

Primary Examiner—C. Dees  
Attorney, Agent, or Firm—George L. Church; Donald R. Johnson; Anthony J. Dixon

[57] ABSTRACT

In order to increase the amount of catalytic metal which can be incorporated in a zeolite catalyst by contact of zeolite with solution of a given amount of chemical containing the catalytic metal, or conversely to reduce the amount of such chemical needed to incorporate a given desired amount of catalytic metal in the catalyst, a zeolite containing a cation, e.g., sodium, replaceable by ammonium ion, is contacted with an aqueous solution of ammonium metalate, e.g., molybdate, and a second ammonium compound, e.g., ammonium chloride, said second ammonium compound providing additional anion for balancing the change of said cation in the solution.

7 Claims, No Drawings

PROCESS FOR PREPARING METAL ZEOLITE CATALYST COMPOSITIONS

BACKGROUND OF THE INVENTION

The present invention relates to a technique for preparing metal catalyst compositions for use in petroleum conversion reactions wherein a crystalline zeolite catalyst support is treated simultaneously with ammonium metalate containing catalytic metal in the anion thereof, and a soluble ammonium compound of a second anion resulting in the formation of a catalytically active composite of the metal and the catalyst base.

It has been known in the art to deposit a metal onto a crystalline zeolite base by simple precipitation techniques.

It has also been known to deposit a metal evenly onto the surface of a zeolite catalyst base through conventional impregnation techniques using a sorptive mechanism.

It is also known to pretreat a catalyst base with an ammonium compound prior to metal impregnation of the base.

Also, the prior art has taught ion-exchange techniques which result in improved metal incorporation into a crystalline zeolite catalyst base. This method comprises treating the catalyst with an aqueous solution containing complex watersoluble metal-ammonium ions which ion exchange with the cations normally present in the zeolite.

Van Helden et al in U.S. Pat. No. 3,442,794, issued May 6, 1969, disclose a pretreatment of the zeolite base with an acid and with an ammonium compound separately prior to ion exchange of the catalyst base with a metal cation in solution, to prepare an improved hydrogenation catalyst.

SUMMARY OF THE INVENTION

Although the catalyst preparation discussed above show good results, a more efficient catalyst preparation technique has now been found which results in increased amounts of metal being deposited onto a catalyst base.

The catalyst bases used for the purpose of the invention are molecular sieve zeolites. The basic formula for these catalysts is as follows:

$$M_n^2O:Al_2O_3:XSiO_2:yH_2O$$

In the formula M represents a metal of valence $n$. Different types of sieves are primarily characterized by a definite range of values of $x$ and $y$ and by a particular x-ray powder diffraction pattern. The X-type zeolite, which is the base catalyst used in the specific embodiment of the present invention, has the desired structure and can serve as the base catalyst for the work to be discussed.

The molecular sieve is contacted with an ammonium metalate solution which contains an additional soluble ammonium compound in such an amount that the ammonium ion concentration of the added ammonium compound is preferably essentially equivalent to the ammonium ion concentration of the ammonium metalate in the solution. However, any substantial amount $NH_4$ compound of second anion will give the benefits of invention to some extent. This procedure markedly increases the amount of metal retained by the catalyst base. Merely exchanging the sieve with an ammonium compound prior to treatment with the ammonium metal, as is taught in the prior art, does not result in as large an amount of the metal being retained by the catalyst as in the simultaneous procedure of the present invention.

As noted subsequently, the function of the second $NH_4+$ compound is apparently to provide additional anion for charge balancing of Na ion entering the solution from the catalyst thereby making available, for incorporation in the zeolite, metalate ion which would otherwise charge balance the Na ion and be held in solution. Any organic or inorganic anion capable of so functioning in the medium of ion exchange can be employed as the second $NH_4$ compound used. Examples are fluoride, chloride, bromide, iodide, carbonate, bicarbonate, sulfate, phosphate, sulfide, thiocyanate, dithiocarbonate, peroxysulfate, acetate, hydroxide, benzoate, carbonate, citrate, nitrate, nitrite, formate, propionate, lactate, malonate, oxalate, tartrate and the like.

Preference is given to the simple inorganic ammonium compounds, notably $NH_4$ compounds such as $NH_4Cl$, $NH_4NO_3$, $NH_4$ sulfates, $NH_4$ phosphates, etc.

Treatment with the mixed solution can vary over a temperature range of ambient to 212°F. with a range of 140° to 160°F. being preferred. The pressure may also vary over a broad range; however, it is preferred that this treatment be effected at or near atmospheric pressure.

The following explanation is offered for the preparative technique of the invention, but it is not intended to be limiting of the procedure disclosed herein.

The use of the ammonium metalate salt for treatment of a sodium form Type-X zeolite may be represented as:

$$NaX + NH_4^+ + M^- \rightarrow NH_4X + Na^+ + M^-$$

where $M^-$ is a metalate ion, i.e., an ion containing catalytic metal. Metalate anion is to be incorporated with the zeolite support by sorption and left in the residue on the zeolite when solvent (water) has been removed. However, the cation or counterion of the metalate, $NH_4+$ in the case at hand, will also remove Na+ from the zeolite by exchange. Na+ removal may be an objective, too. Much if not all, of that Na+ will go into solution when exchanged by $NH_4+$. Unless additional anion is present, metalate will remain in solution to counterbalance Na+. That is not undesirable if Na+ removal is the only goal. That is undesirable if sorption of metalate anion on the zeolite is another goal or is the chief goal. The inclusion of an ammonium compound, for example ammonium chloride, provides an anion to balance the $Na^+$ which enters the solution. The ammonium chloride would then enable a deeper $Na^+$ exchange to be made by providing a more readily available counter-ion for $Na^+$ and thereby allow the $M^-$ anion to be sorbed more readily by the zeolite without resorting to time consuming multiple exchanges and impregnations.

Another desirable feature of the invention is the addition of larger amounts of impregnated metal to an already exchanged zeolite.

EXAMPLE I

Catalysts consisting of molybdenum supported on a Type-X crystalline molecular sieve zeolite were prepared by four different methods.

In all methods, the starting material was the sodium form of a Type-X zeolite which is a conventional and readily commercially available type of catalyst base.

1. In the first method, 150 grams of Na Type-X catalyst was treated with a molybdenum solution comprising 24.48 grams of $(NH_4)_6Mo_7O_{24}\cdot 4H_2O$ in 1,200 milliliters of water. The dried catalyst was added in small increments to the solution at 150°F while continually stirring the solution. The stirring continues for 24 hours at 150°F, after which the solution is filtered and the catalyst separated. The catalyst is then dried for 16 hours at 125°C.

2. Catalyst 2 was prepared by a procedure similar to Catalyst 1 except that 36.72 grams of $(NH_4)_6Mo_7O_{24}\cdot 4H_2O$ in 900 milliliters of water was used as the preparative solution. This amount is equivalent to double the concentration used for Catalyst 1.

3. The third catalyst was prepared in a more advanced method discussed by the prior art; that is, pretreatment of the catalyst base with an ammonium chloride solution and subsequent treatment with the metal solution.

The first step of this procedure, the exchange step, comprises adding 200 grams of the Na-form X-zeolite to 600 milliliters of an ammonium chloride solution prepared by adding 300 grams of $NH_4Cl$ to 1,000 milliliters of water. This mixture is stirred for 30 minutes at 80°C and filtered; and, the wet catalyst cake is then added to the remaining 400 milliliters of the $NH_4Cl$ solution, stirred for 30 minutes at 80°C and filtered again. This exchange of the wet catalyst cake is repeated three additional times, resulting in a total of four exposures of the catalyst to the $NH_4Cl$ solution. The final separated catalyst is washed with distilled water until chloride free and dried for 16 hours at 125°C. This intermediate catalyst is designated "3A" for the purposes of latter discussion and comparison.

Catalyst 3A is then treated as described in (1) above to produce Catalyst 3.

(4) The inventive procedure was used to prepare Catalyst 4.

To 150 grams of the Na-form X zeolite, a molybdenum solution comprising 36.72 grams $(NH_4)_6Mo_7O_{24}\cdot 4H_2O$ plus 22.7 grams $NH_4Cl$ in 900 milliliters of $H_2O$ was added in small increments at 150°F while stirring. The stirring continued for 24 hours at 150°F at which time the solution was filtered, the catalyst separated and dried at 125°C for 16 hours.

The metals levels of the four final catalysts and one intermediate catalyst are compared below to the base catalyst used:

| Catalyst | Relative Mo Amount in Solution | $NH_4Cl$ in Solution | Na, Wt% | Mo, Wt% | N, Wt% |
|---|---|---|---|---|---|
| Base (Type-X) | — | — | 14.24 | — | — |
| 1 | $1x^{(1)}$ | No | 12.19 | 1.96 | 0.54 |
| 2 | $2x^{(1)}$ | No | 12.31 | 2.38 | 1.35 |
| 3A | — | Yes | 2.69 | — | 3.66 |
| 3 | $1x^{(1)}$ | No | 2.68 | 1.23 | 3.58 |
| 4 | $2x^{(1)}$ | Yes | 7.02 | 3.45 | 3.62 |

$^{(1)}$ x is the amount of molybdenum in the solution used in preparation of Catalyst 1.

Comparing Catalyst 4 to Catalyst 2 shows the substantial increase of molybdenum addition in the inventive procedure used to prepare Catalyst 4. Also, Catalyst 4 contains more than twice the amount of $Na^+$ of the stepwise procedure of Catalyst 3.

EXAMPLE II

In the following set of tests, the base catalyst was first exchanged with a cobalt solution which results in Catalyst 5. The procedure used was similar to that used in the Catalyst 3A preparation except with a cobalt solution substituted for the ammonium chloride solution used in the Catalyst 3A preparation.

This cobalt-X catalyst was then subjected to the following preparative techniques:

1. Treatment with a molybdenum solution with 0.5x relative Mo concentration in a Catalyst 1 procedure,
2. Treatment with a 2.0x relative concentration of Mo solution in a Catalyst 2 procedure and
3. Simultaneous exchange-impregnation with a 1.0x concentration of Mo solution in the invention preparative technique of the Catalyst 4 procedure.

The three catalysts prepared are designated Catalyst 6, Catalyst 7 and Catalyst 8, respectively, for the purposes of comparison and discussion below.

| Catalyst | Relative Mo Amount in Solution | $NH_4Cl$ in Solution | Na | Weight % Co | Mo | N |
|---|---|---|---|---|---|---|
| 5 | — | — | 6.93 | 6.48 | — | — |
| 6 | 0.5x | No | 6.17 | 6.35 | 0.82 | 0.45 |
| 7 | 2.0x | No | 5.42 | 6.40 | 3.77 | 1.49 |
| 8 | 1.0x | Yes | 5.03 | 6.53 | 4.58 | 2.46 |

The above data again indicate that the inclusion of $NH_4Cl$ in the ammonium molybdate solution results in a catalyst with a larger amount of molybdenum. The above data also shows that the invention procedure preferentially exchanges residual Na from the initially Co exchanged catalyst rather than back exchanging ammonium ion for cobalt ion.

Comparing Catalyst 8 to Catalyst 7 shows the inventive procedure to be more effective with one half as much Mo in the solution, and comparison of Catalyst 8 to Catalyst 6 shows the inventive procedure to be over five times as effective with just double the Mo concentration in solution.

Catalyst 4, prepared by the novel procedure of this invention, has use in petroleum conversion reactions such as hydrodecolorization of lubricating oils, as shown in Example 3 below.

EXAMPLE III

An 18.2 °API/60°F gravity lubricating oil boiling in the range of 700° to 950°F was subjected to a high pressure fixed-bed hydrodecolorization reaction using Catalyst 4 as prepared above. Conditions for the process were as follows:

| | |
|---|---|
| Temperature | 640°F |
| Pressure | 1000 psig |
| Time on Stream | 22.5 hours |
| Catalyst | Type 4 |
| Hydrogen SCFH/V | 1.1 |

The charge stock had an original ASTM D-1500 color of 5.50 and an ASTM D-1500 color after the above process of 2.00 initial and 2.75 aged, showing the utility of Catalyst 4.

The above hydrodecolorization example shows substantial activity in a catalyst prepared according to the process of the invention, although the amount of molybdenum in the catalyst of the example is not necessarily the optimum for the process involved. Determination of such optimum is within the ability of a person skilled in the art in the light of the present disclosure.

The process of the invention enables a greater amount of catalytic metal to be incorporated in a zeolite catalyst by contact of zeolite with solution of a given amount of chemical containing the catalytic metal, and therefore makes possible the reduction of the amount of such chemical needed to incorporate a given desired amount of catalytic metal in the catalyst. The amount of chemical needed to obtain a particular desired amount of catalytic metal in the catalyst and the optimum composition of the treating solution to obtain such amount can again be determined by a person skilled in the art in the light of the present disclosure.

We claim as our invention:

1. A process for preparing catalysts which comprises contacting a crystalline zeolite base, containing cation replaceable by ammonium ion, with an aqueous solution consisting essentially of an ammonium metal compound containing catalytic metal in the anion thereof, and a non-metallic soluble ammonium salt.

2. The process of claim 1 wherein the ammonium ion concentration in the aqueous solution due to said non-metallic soluble ammonium salt is essentially equivalent to the ammonium ion concentration in the aqueous solution due to said ammonium metal compound.

3. The process of claim 1 wherein the non-metallic soluble ammonium salt is ammonium chloride.

4. The process of claim 1 wherein the crystalline zeolite base is a sodium form zeolite X molecular sieve.

5. The process of claim 1 wherein the ammonium metal compound is ammonium molybdate, the soluble ammonium salt is ammonium chloride, the crystalline zeolite base is a sodium form zeolite X molecular sieve and the ammonium ion concentration in the aqueous solution due to the ammonium chloride is essentially equivalent to the ammonium ion concentration in the aqueous solution due to the ammonium molybdate.

6. The process of claim 5 wherein the crystalline zeolite base has been previously ion-exchanged with a first metal different than the second metal used in the ammonium metal compound.

7. The process of claim 6 wherein said first metal is cobalt and said second metal is molybdenum.

* * * * *